(12) United States Patent
Anglin et al.

(10) Patent No.: US 8,769,269 B2
(45) Date of Patent: Jul. 1, 2014

(54) CLOUD DATA MANAGEMENT

(75) Inventors: Howard N. Anglin, Austin, TX (US); Nduwuisi Emuchay, Austin, TX (US); Wing L. Leung, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 12/855,323

(22) Filed: Aug. 12, 2010

(65) Prior Publication Data
US 2012/0042162 A1 Feb. 16, 2012

(51) Int. Cl.
*H04L 29/06* (2006.01)
(52) U.S. Cl.
USPC ............................... 713/165; 726/1; 707/827
(58) Field of Classification Search
None
See application file for complete search history.

(56) References Cited

U.S. PATENT DOCUMENTS

| | | | |
|---|---|---|---|
| 6,173,322 B1* | 1/2001 | Hu | 709/224 |
| 7,321,926 B1* | 1/2008 | Zhang et al. | 709/220 |
| 7,502,836 B1* | 3/2009 | Menditto et al. | 709/217 |
| 7,584,262 B1* | 9/2009 | Wang et al. | 709/217 |
| 7,869,383 B2* | 1/2011 | Tabbara et al. | 370/254 |
| 2008/0080718 A1 | 4/2008 | Meijer et al. | |
| 2008/0083036 A1 | 4/2008 | Ozzie et al. | |
| 2008/0126357 A1* | 5/2008 | Casanova et al. | 707/10 |
| 2009/0300719 A1 | 12/2009 | Ferris | |
| 2010/0002882 A1 | 1/2010 | Rieger et al. | |
| 2010/0299313 A1* | 11/2010 | Orsini et al. | 707/652 |
| 2010/0332401 A1* | 12/2010 | Prahlad et al. | 705/80 |
| 2011/0055161 A1* | 3/2011 | Wolfe | 707/652 |
| 2011/0264717 A1* | 10/2011 | Grube et al. | 707/827 |
| 2011/0276538 A1* | 11/2011 | Knapp et al. | 707/626 |
| 2011/0276656 A1* | 11/2011 | Knapp et al. | 709/219 |
| 2013/0254538 A1* | 9/2013 | Orsini et al. | 713/165 |

OTHER PUBLICATIONS

Mowbray et al., "A Client-Based Privacy manager for Cloud Computing", 2008, ACM Digital Library, pp. 1-8.
Takayama et al., "Performance and Reliability of a Revocation Method Utilizing Encrypted Backup Data", 2009 15th IEEE Pacific Rim International Symposium on Dependable Computing, pp. 151-159.
Hu et al., "A Benchmark of Transparent Data Encryption for Migration of Web Applications in the Cloud", 2009 Eighth IEEE International Conference on Dependable, Autonomic and Secure Computing.
Mell et al., "The NIST Definition of Cloud Computing", Version 15, Oct. 7, 2009, pp. 1-2 http://csrc.nist.gov/groups/SNS/cloud-computing/.

* cited by examiner

*Primary Examiner* — Michael R Vaughan
(74) *Attorney, Agent, or Firm* — Yee & Associates, P.C.; Jeffrey S. LaBaw

(57) ABSTRACT

The different illustrative embodiments provide a method, computer program product, and apparatus for managing data. An encrypted file containing the data is divided into a plurality of segments. The plurality of segments are sent to a plurality of cloud computing environments for storage in the plurality of cloud computing environments. Each cloud computing environment in the plurality of cloud computing environments receives a portion of the plurality of segments. The portion of the plurality of segments is associated with a cloud computing environment in the plurality of cloud computing environments to which the portion of the plurality of segments was sent.

17 Claims, 9 Drawing Sheets

US 8,769,269 B2

CLOUD DATA MANAGEMENT

BACKGROUND

1. Field

The disclosure relates generally to an improved data processing system and more specifically to managing data. Even more specifically, the disclosure relates to a method, computer program product, and apparatus for managing data in clouds.

2. Description of the Related Art

Data is frequently transmitted over networks for storage in a location remote to the computer system with which a user is interacting. For example, an electronic mail server computer that receives electronic mail from the Internet may not store the electronic mail in a storage device connected to the electronic mail server computer. Instead, the electronic mail server computer may send the message data to another computer system that stores the message data on a connected storage device.

Cloud computing is growing in popularity. Cloud computing is a type of computing in which shared resources are made available to computers through the Internet. In cloud computing, the logistics of the storage and/or service located in the cloud are abstracted from the user. Users of services in a cloud are typically unaware of the storage devices, servers, clusters, locations, and other logistics involved in delivering the service. In many cases, users are unaware of this information because the service is provided by an entity not within the control of the users.

Data may be sent from a computer system to a cloud for storage. The data may be retrieved from the cloud at a later time. The computer system sending the data to the cloud may not have the resources available to store the data on a storage device connected to the computer system. Alternatively, a user may desire to have the data stored in a location that is accessible through the Internet and/or configured for frequent backups.

While stored in the cloud, the provider of the cloud has access to the data. Employees of the cloud provider may access the data without the knowledge of the user or entity that stored the data in the cloud. Additionally, the cloud provider may dispose of storage devices during maintenance without properly removing the data stored by the user. The user may also be unable to access the data if the cloud provider experiences a technical difficulty or ceases to provide the cloud.

SUMMARY

The different illustrative embodiments provide a method, computer program product, and apparatus for managing data. An encrypted file containing the data is divided into a plurality of segments. The plurality of segments are sent to a plurality of cloud computing environments for storage in the plurality of cloud computing environments. Each cloud computing environment in the plurality of cloud computing environments receives a portion of the plurality of segments. The portion of the plurality of segments is associated with a cloud computing environment in the plurality of cloud computing environments to which the portion of the plurality of segments was sent.

DETAILED DESCRIPTION

Figure 1:
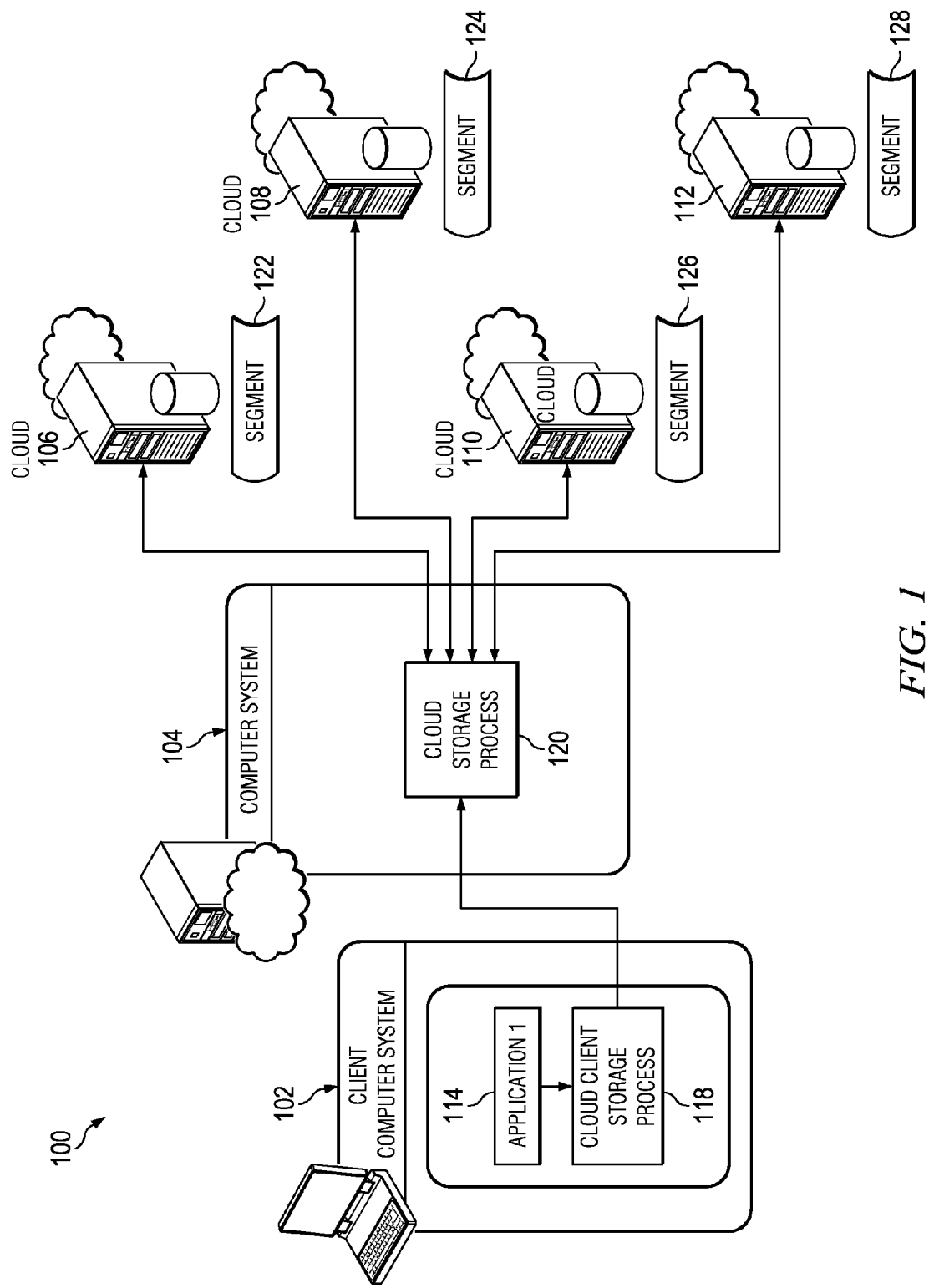
FIG. 1 depicts an illustration of a data management environment in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With specificity to FIG. 1, an illustration of a data management environment is depicted in accordance with an illustrative embodiment. Data management environment 100 contains client computer system 102, computer system 104, cloud 106, cloud 108, cloud 110, and cloud 112.

Client computer system 102 runs application 114. Application 114 is configured to store data generated by application 114 using cloud client storage process 118. Cloud cloud client storage process 118 receives data to be stored from application 114 and encrypts the data. Cloud client storage process 118 then sends the data to computer system 104. Cloud storage process 120 runs on computer system 104 and receives the data from client computer system 102.

Cloud storage process 120 contains a registry of cloud providers. The registry of cloud providers contains information about cloud providers that are available to store data for computer system 104. The information may include contact information, such as addresses and ports, and format information, such as metadata and/or credentials, to be included with a request for the provider to store data.

In some illustrative embodiments, the information about each cloud provider in the registry also contains characteristics of the cloud provider. For example, a particular cloud provider may be listed as having a 99 percent uptime service level guarantee, and a limitation of only storing 5 gigabytes of data. Cloud client storage process 118 may send desired characteristics for a desired provider to receive the data to cloud storage process 120 with the data or before the data is sent to cloud storage process 120. For example, cloud client storage process 118 may include a parameter with the data that contains a desired level of security for the data, such as 128-bit encryption. The 128-bit encryption may be in addition to encryption performed by cloud client storage process 118.

Cloud storage process 120 divides the data into segments. The number and size of the segments may be random or may be defined by a rule or policy accessible by cloud storage process 120. In this illustrative example, cloud storage process 120 divides the data into segments 122, 124, 126, and 128. Of course, cloud storage process 120 may divide the data into more segments or fewer segments in other illustrative embodiments. The rule or policy may also define how many segments may be stored with a cloud provider. The segments to be stored with a cloud provider are referred to as a portion of the segments.

Cloud storage process 120 identifies a group of cloud providers in the registry to store the number of portions of the segments. The group of cloud providers may be identified by identifying providers that meet or exceed the parameters sent by cloud client storage process 118 for storage of the segments. In this illustrative embodiment, cloud storage process 120 identifies clouds 106, 108, 110, and 112 as meeting or exceeding the parameters. In some illustrative embodiments, cloud storage process 120 sends one segment to each of clouds 106, 108, 110, and 112 for storage. For example, segment 122 may be sent to cloud 106, segment 124 may be sent to cloud 108, segment 126 may be sent to cloud 110, and segment 128 may be sent to cloud 112.

In some illustrative embodiments, however, the segments may be sent to more than one of clouds 106, 108, 110, and 112. The segments may be sent to more than one cloud so backups of the data are preserved in one cloud in the event that another cloud is taken offline. For example, segment 122 may be sent to cloud 106 and cloud 110. If cloud 110 is taken offline, segment 122 is still available in cloud 106.

In some illustrative embodiments, cloud storage process 120 further divides each of segments 122, 124, 126, and 128 into subsegments instead of sending segments 122, 124, 126, and 128 to clouds 106, 108, 110, and 112. In such illustrative embodiments, cloud storage process 120 identifies a group of cloud providers in the registry to store a number of portions of the subsegments. Cloud storage process 120 then sends the portions of the subsegments to the clouds instead of the portions of the segments.

Cloud storage process 120 then updates a directory. The directory may be updated with an identifier for the data, such as a file name or number, an identifier for the file unique in the directory, and information about each of the segments into which the data was divided. The information about each of the segments consists of a file name for the data, an identifier for the data unique in the directory, addresses within the file that are contained in the segment, and identities of the one or more clouds that store the segment, and a checksum. A checksum is a numeric value generated by cloud storage process 120 after dividing the data and prior to sending the data to clouds 106, 108, 110, and 112 that may be used to regenerate a segment that is unavailable when the other segments for the data are available.

Once the data is stored in clouds 106, 108, 110, and 112, cloud storage process 120 waits for another request. In these examples, cloud client storage process 118 requests from cloud storage process 120 that the data be retrieved. Cloud client storage process 118 may include a file name and/or unique identifier in the request. Cloud client storage process 120 locates the entries having the file name and/or unique identifier in the directory. Cloud storage process 120 then retrieves each segment from the clouds in which the segment is stored. Of course, cloud storage process 120 may only retrieve each segment from one cloud in which the segment is stored, regardless of whether the segment is stored in multiple clouds. If the segment is unavailable from one cloud at the time cloud storage process 120 requests the segment, cloud storage process 120 may request the same segment from another cloud that stores the segment. For example, if segment 122 is stored in cloud 106 and cloud 110, and cloud 106 becomes unavailable, cloud storage process 120 may retrieve both segment 122 and segment 126 from cloud 110.

Once cloud storage process 120 receives all the segments for the data, cloud storage process 120 regenerates the data from the segments using the addresses in the data for each segment stored in the directory. Cloud storage process 120 then returns the data to cloud client storage process 118. Cloud client storage process 118 decrypts the data and returns the data to application 114.

In illustrative embodiments in which the segments are divided into subsegments prior to storage in the clouds, cloud storage process 120 retrieves each subsegment from the clouds in which the subsegment is stored. Cloud storage process 120 may only retrieve each subsegment from one cloud in which the subsegment is stored, regardless of whether the subsegment is stored in multiple clouds. If the subsegment is unavailable from one cloud at the time cloud storage process 120 requests the subsegment, cloud storage process 120 may request the same subsegment from another cloud that stores the subsegment. Cloud storage process 120 then regenerates the data from the subsegments using the addresses in the data for each subsegment stored in the directory. Cloud storage process 120 then returns the data to cloud client storage process 118.

Figure 2:
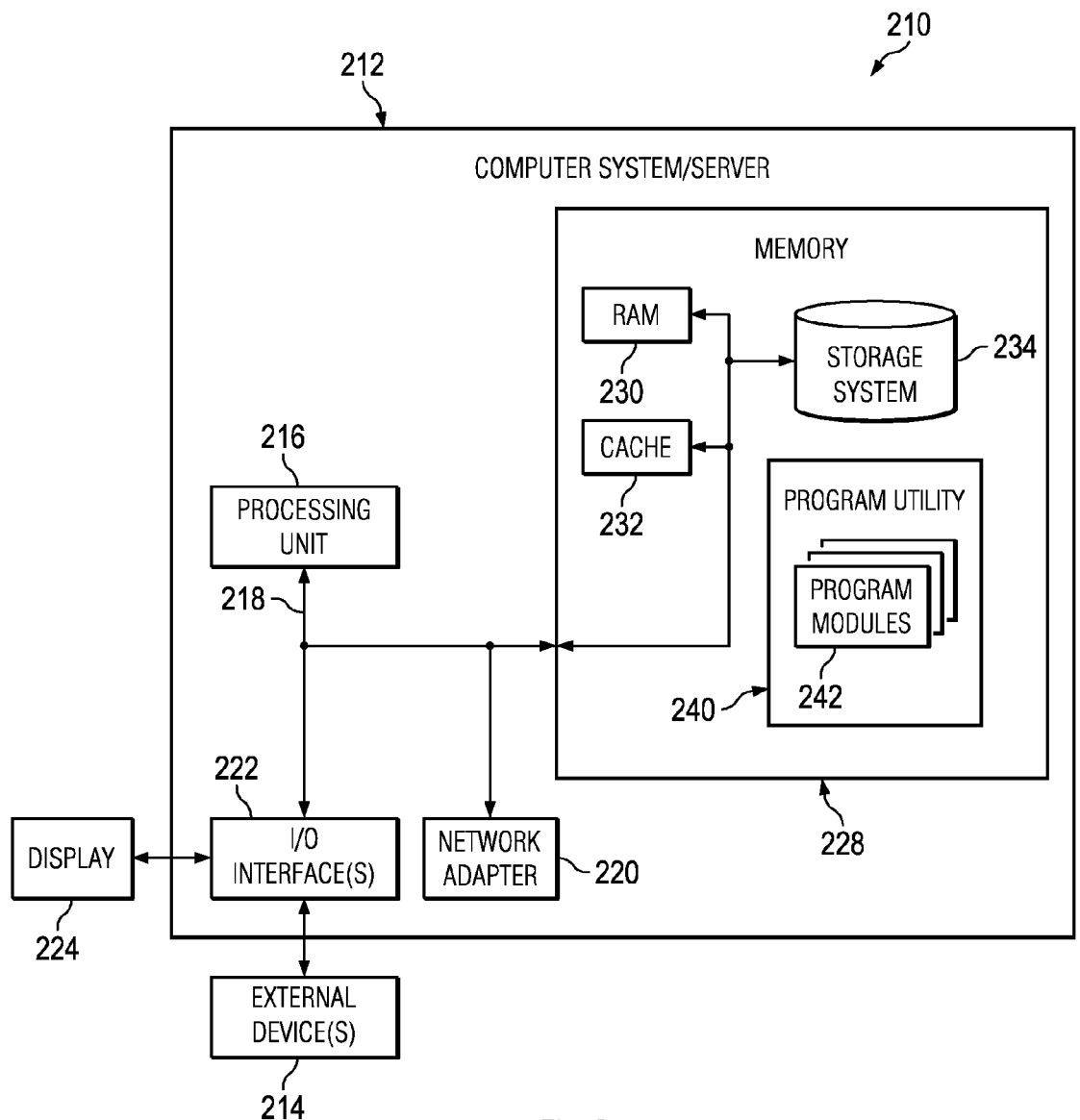
FIG. 2 depicts a cloud computing node according to an embodiment of the present invention.
Figure 3:
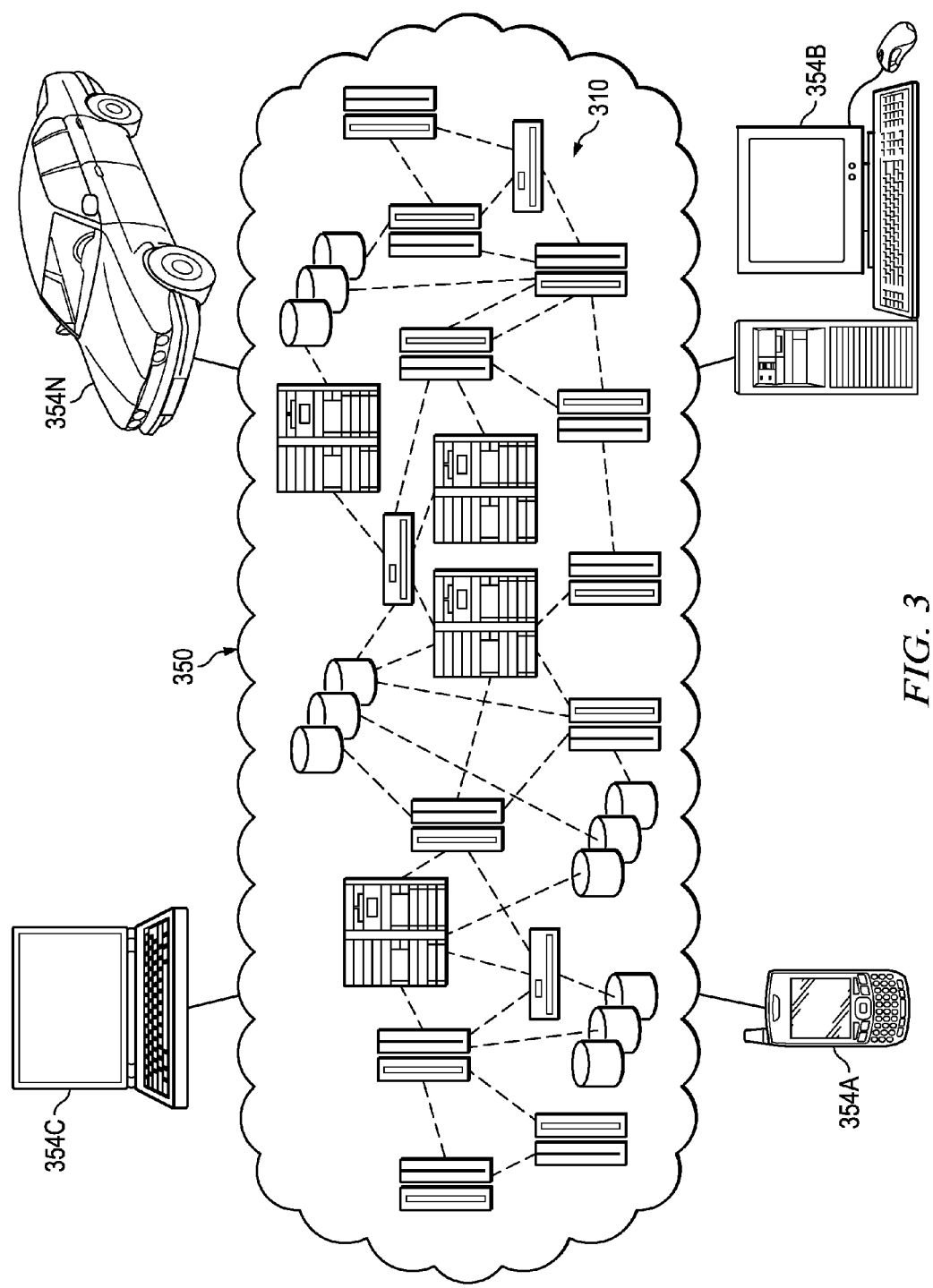
FIG. 3 depicts a cloud computing environment according to an embodiment of the present invention.
Figure 4:
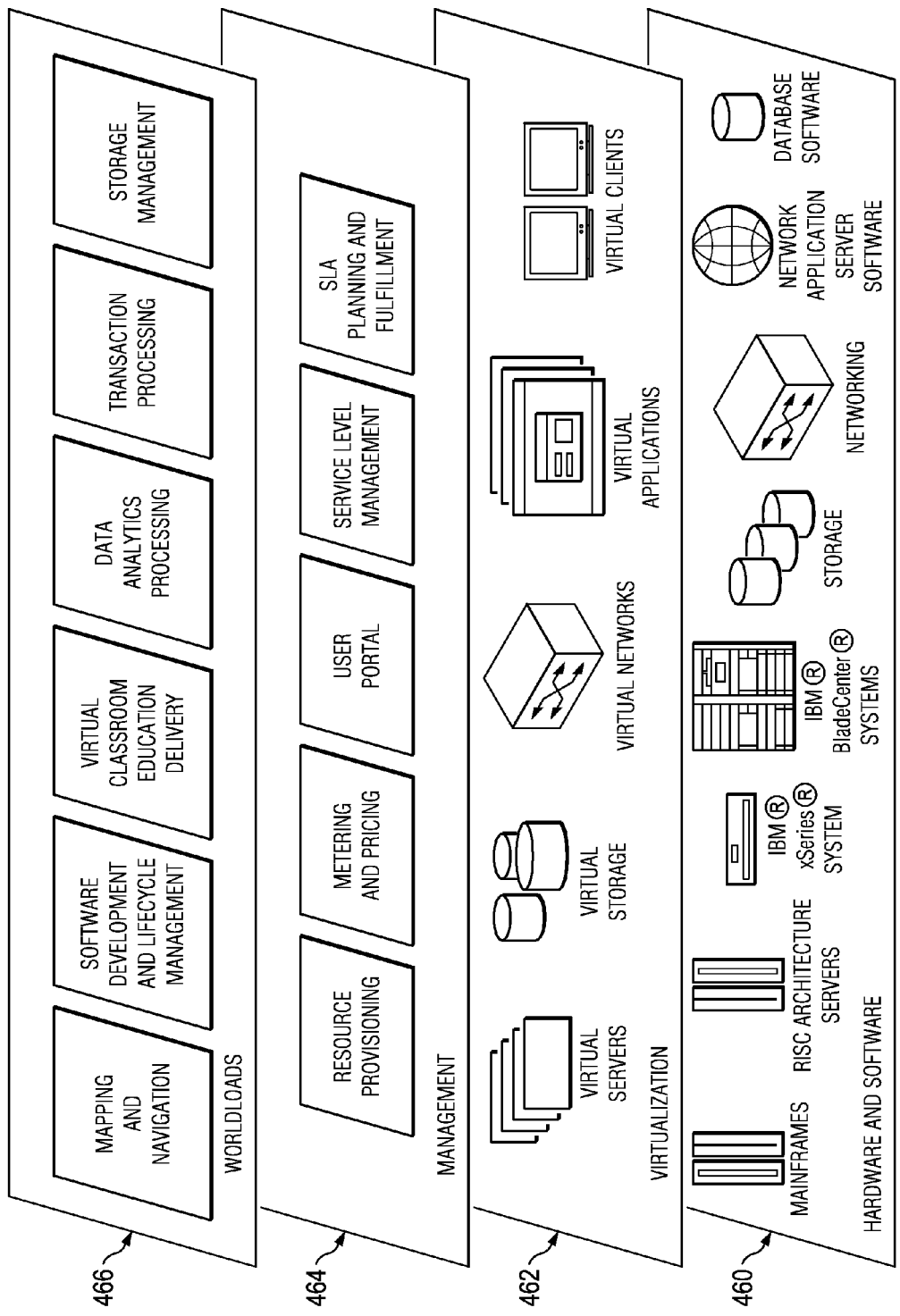
FIG. 4 depicts abstraction model layers according to an embodiment of the present invention.

Turning now to FIGS. 2-4, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the detailed description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 2, a schematic example of a cloud computing node is shown. Cloud computing node 210 is only one example of a suitable cloud computing node and is not intended to suggest any limitation as to the scope of use or functionality of embodiments of the invention described herein. Regardless, cloud computing node 210 is capable of being implemented and/or performing any of the functionality set forth hereinabove.

In cloud computing node 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 212 in cloud computing node 210 is shown in the form of a general-purpose computing device. The components of computer system/server 212 may include, but are not limited to, one or more processors or processing units 216, a system memory 228, and a bus 218 that couples various system components, including system memory 228, to processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating systems, one or more application programs, other program modules, and program data, or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via I/O interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples include, but are not limited to: microcode, device drivers, redundant processing units, external disk drive arrays, RAID systems, tape drives, and data archival storage systems, etc.

Referring now to FIG. 3, illustrative cloud computing environment 350 is depicted. As shown, cloud computing environment 350 comprises one or more cloud computing nodes 310 with which local computing devices used by cloud consumers, such as, for example, personal digital assistant (PDA) or cellular telephone 354A, desktop computer 354B, laptop computer 354C, and/or automobile computer system 354N may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 3 are intended to be illustrative only and that computing nodes 310 and cloud computing environment 350 can communicate with any type of computerized device over any type of network and/or network addressable connection (e.g., using a web browser).

Referring now to FIG. 4, a set of functional abstraction layers provided by cloud computing environment 350 in FIG. 3 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes, in one example IBM® zSeries® systems; RISC (Reduced Instruction Set Computer) architecture based servers, and in one example IBM pSeries® systems; IBM xSeries® systems; IBM BladeCenter® systems; storage devices; networks and networking components. Examples of software components include network application server software, in one example IBM WebSphere® application server software and database software, and in one example IBM DB2® database software (IBM, zSeries, pSeries, xSeries, BladeCenter, WebSphere, and DB2 are trademarks of International Business Machines Corporation registered in many jurisdictions worldwide).

Virtualization layer 462 provides an abstraction layer from which the following examples of virtual entities may be provided: virtual servers, virtual storage, virtual networks, including virtual private networks, virtual applications and operating systems, and virtual clients.

In one example, management layer 464 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 466 provides examples of functionality for which the cloud computing environment may be utilized. Examples of workloads and functions which may be provided from this layer include: mapping and navigation, software development and lifecycle management, virtual classroom education delivery, data analytics processing, transaction processing, and storage processing. Storage processing allows the cloud computing environment to receive, store, receive, and send segments of a file from/to a cloud storage process. Storage processing may also consist of sending capabilities and/or limitations of the cloud computing environment to a cloud storage process for storage in a directory of cloud computing environments in which to store segments.

The different illustrative embodiments recognize and take into account a number of different considerations. For example, the different illustrative embodiments recognize that users with data of high value may not wish to have cloud computing environment employees or unauthorized parties accessing the high value data. Even with encryption, it is possible that the data can be decrypted by an unauthorized party. The different illustrative embodiments recognize that dividing the encrypted data into a plurality of segments and storing the segments in different cloud computing environments improves security because an unauthorized party that gains access to a single cloud computing environment may not have access to the other cloud computing environments that contain the remaining segments of the data.

Additionally, the different illustrative embodiments recognize that cloud computing environments become unavailable for a variety of reasons. For example, the cloud computing environment may experience technical inconsistencies or the entity controlling the cloud computing environment may leave the business of providing a cloud computing environment. Thus, the different illustrative embodiments allow backup copies of the segments to be stored with multiple cloud computing environments and retrieved in the event that a cloud computing environment is unavailable.

The different illustrative embodiments also recognize that the user at the client computer running the application that sends the request to store the data may be uninterested in or unable to choose particular cloud computing environments to store segments of data. Storing the data in the cloud computing environments also allows the client to have fewer system resources, such as hard drive space.

Thus, the different illustrative embodiments provide a method, computer program product, and apparatus for managing data. An encrypted file containing the data is divided into a plurality of segments. The plurality of segments are sent to a plurality of cloud computing environments for storage in the plurality of cloud computing environments. Each cloud computing environment in the plurality of cloud computing environments receives a portion of the plurality of segments. The portion of the plurality of segments is associated with a cloud computing environment in the plurality of cloud computing environments to which the portion of the plurality of segments was sent.

Figure 5:
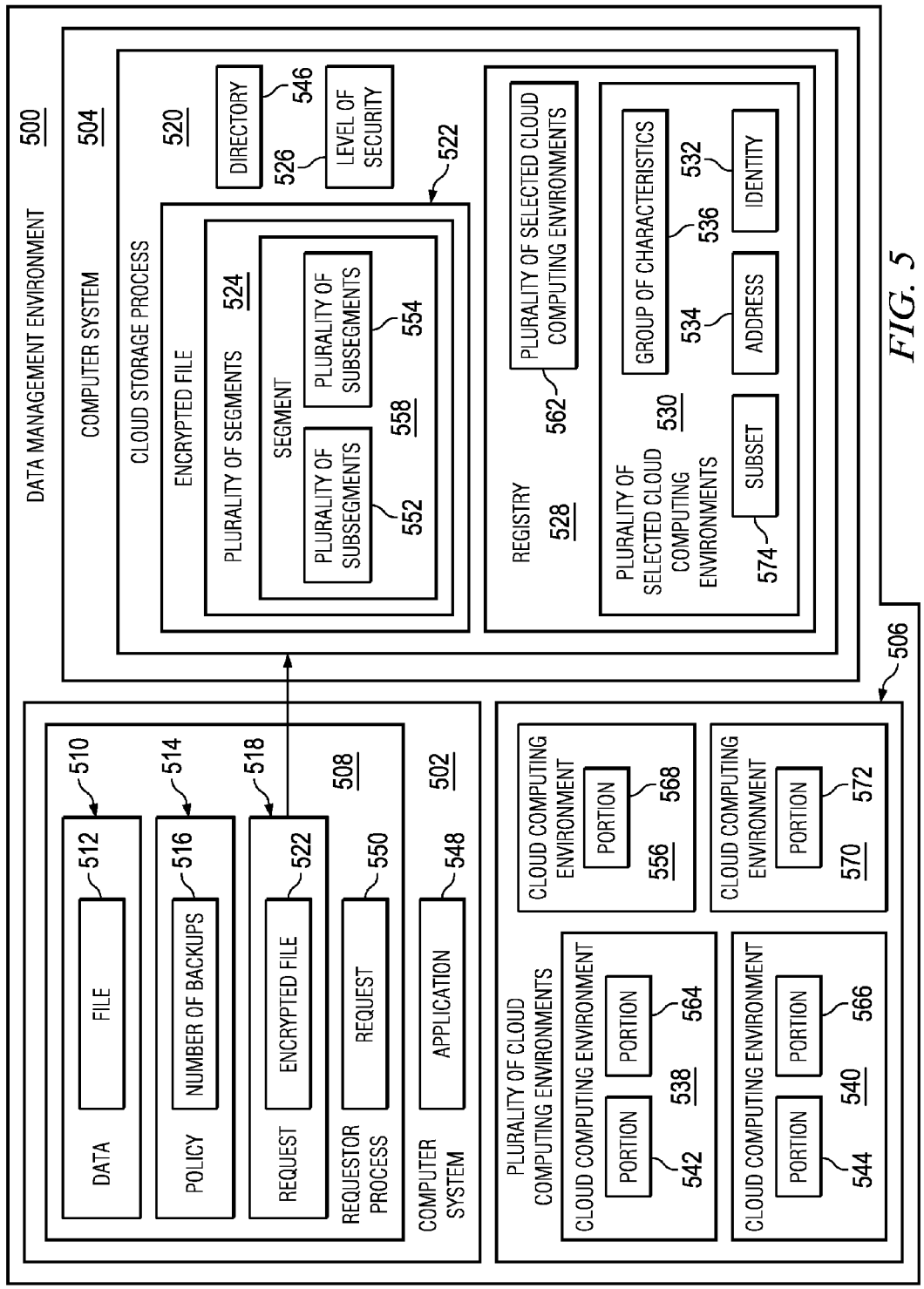
FIG. 5 depicts an illustration of a block diagram for a data management environment in accordance with an illustrative embodiment.

Turning now to FIG. 5, an illustration of a block diagram for a data management environment is depicted in accordance with an illustrative embodiment. Data management environment 100 in FIG. 1 is an example implementation of data management environment 500.

Data management environment 500 contains computer system 502, computer system 504, and plurality of cloud computing environments 506. Computer system 502 runs requestor process 508. Computer system 502, computer system 504, and plurality of cloud computing environments 506 are example implementations of computer system 212 in FIG. 2. Requestor process 508 receives data 510 from application 548. Data 510 is in the form of file 512. Application 548 sends file 512 to requestor process 508 in a request to write file 512 to disk. Application 548 may send file 512 to requestor process 508 using an application programming interface (API).

Requestor process 508 receives file 512 and encrypts file 512 to form encrypted file 522. In this illustrative example, requestor process 508 uses the Advanced Encryption System (AES) encryption algorithm; however, any suitable encryption algorithm may be used. Requestor process 508 then generates request 518. Request 518 contains encrypted file 522. Request 518 is a request for cloud storage process 520 to store encrypted file 522 in plurality of cloud computing environments 506. In some illustrative embodiments, request 518 also contains policy 514. Policy 514 is a set of parameters for use in storing encrypted file 522. For example, policy 514 may include number of backups 516 of segments of encrypted file 522 to be stored in plurality of cloud computing environments 506. Requestor process 508 then sends request 518 to cloud storage process 520 running on computer system 504.

Computer system 504 runs cloud storage process 520. Cloud storage process 520 receives request 518 containing encrypted file 522. Computer system 504 then processes registry 528. Registry 528 is a collection of information about plurality of cloud computing environments 506. Plurality of cloud computing environments 506 may submit and update information in registry 528. Plurality of cloud computing environments 506 are example implementations of cloud computing node 210 in FIG. 2.

The information in registry 528 may consist of identity 532 of each of plurality of cloud computing environments 506, address 534 and port of each of plurality of cloud computing environments 506, and group of characteristics 536 of each of plurality of cloud computing environments 506. Identity 532 may be a name or identifier unique in registry 528. Address 534 is an Internet Protocol (IP) address or domain name and a path for a location to upload the segments to be stored. Group of characteristics 536 consists of capabilities and/or limitations of each of plurality of cloud computing environments 506. For example, group of characteristics 536 may contain a maximum amount of space for storing data, additional encryption that is performed on stored data, and formats of data accepted for storage.

Cloud storage process 520 identifies plurality of selected cloud computing environments 530 using registry 528. More specifically, cloud storage process 520 identifies cloud computing environments in registry 528 that meet or exceed characteristic described in policy 514. Alternatively, policy 514 may be stored on computer system 504 and accessible to cloud storage process 520. In such illustrative embodiments, request 518 may also contain level of security 526. Level of security 526 is a characteristic that describes a minimum amount of physical and electronic security measures in place at cloud computing environments to store encrypted file 522. In such illustrative embodiments, cloud storage process 520 identifies each of plurality of cloud computing environments 506 by identifying cloud computing environments in registry 528 that have security measures described in group of characteristics 536 that meet or exceed level of security 526. In these examples, cloud computing environment 538 and cloud computing environment 540 are in plurality of selected cloud computing environments 530.

Once cloud storage process 520 identifies plurality of selected cloud computing environments 530, cloud storage process 520 identifies the number of segments into which encrypted file 522 should be divided. In these examples, policy 514 contains a parameter for the number of segments into which encrypted file 522 should be divided. However, policy 514 may instead specify that encrypted file 522 should be divided into a random number of segments, or segments of a particular size, regardless of number.

Alternatively, policy 514 may specify that encrypted file 522 should be divided into segments of a random size, regardless of number. In such an illustrative embodiment, encrypted file 522 is divided into segments of a random size so an unauthorized party desiring to correctly reorder encrypted file 522 using data stored in cloud computing environment 538 and/or cloud computing environment 540 would be unaware of the correct order into which encrypted file 522 should be reordered.

Once cloud storage process 520 identifies the number of segments into which encrypted file 522 is to be divided, cloud storage process 520 generates plurality of segments 524. Plurality of segments 524 are portions of encrypted file 522. The portions may be contiguous portions of encrypted file 522 or noncontiguous portions of encrypted file 522.

Cloud storage process 520 also processes number of backups 516 when generating plurality of segments 524. Number of backups 516 is a requested number of backup copies for some or each of plurality of segments 524. In other words, number of backups 516 is a requested number of duplicate segments in plurality of segments 524. Cloud storage process 520 adds such backup segments to plurality of segments 524 for storage in plurality of selected cloud computing environments 530.

Cloud storage process 520 then determines which portions of plurality of segments 524 are to be stored in which cloud computing environment in plurality of cloud computing environments 506. In some illustrative embodiments, cloud storage process 520 evenly divides plurality of segments 524 into each portion. For example, if plurality of segments 524 consists of four segments, cloud storage process 520 may divide plurality of segments 524 into portion 542 containing two segments, and portion 544 containing two segments. In another example, plurality of segments 524 consists of four segments and four backup segments for a total of eight segments. Portion 542 may then contain four segments and portion 544 may contain four segments. The four segments in portion 542 are two segments of encrypted file 522 and two backup copies of the segments stored in portion 544. Likewise, portion 544 contains two segments of encrypted file 522 not stored in portion 542 and two backup copies of the segments stored in portion 542.

Cloud storage process 520 then uses address 534 for plurality of selected cloud computing environments 530 to send portions 542 and 544 to cloud computing environment 538 and cloud computing environment 540, respectively. Cloud computing environment 538 stores portion 542 of plurality of segments 524. Likewise, cloud computing environment 540 stores portion 544 of plurality of segments 524.

Finally, cloud storage process 520 updates directory 546 with information about plurality of segments 524. Directory 546 is a data source that contains information about accessing plurality of segments 524 in plurality of selected cloud computing environments 530. For example, directory 546 may store a file name and/or identifier for encrypted file 522 unique in directory 546, the number of plurality of segments 524, addresses within encrypted file 522 for each of plurality of segments 524, and a checksum value for each of plurality of segments 524. A checksum value is a numeric value that contains information about a segment in plurality of segments 524 such that the segment may be regenerated using the checksum value and other segments in plurality of segments 524.

In some illustrative embodiments, cloud storage process 520 divides each segment in plurality of segments 524 into one or more pluralities of subsegments prior to sending portions 542 and 544 to plurality of selected cloud computing environments 530. A subsegment of a segment in plurality of segments 524 is a part of the segment. In these examples, cloud storage process 520 divides segment 558 in plurality of segments 524 into plurality of subsegments 552 and plurality of subsegments 554. Of course, cloud storage process 520 may divide segment 558 into additional pluralities of subsegments in other illustrative embodiments. Plurality of subsegments 552 consists of all data in segment 558. Likewise, plurality of subsegments 554 consists of all data in segment 558. Of course, segment 558 is a non-limiting example, and plurality of segments 524 may consist of additional segments. Segment 558 is divided into plurality of subsegments 552 and plurality of subsegments 554 so segment 558 may not be reordered and accessed by an unauthorized party.

Cloud storage process 520 identifies a number and subsegment size for plurality of subsegments 552 and plurality of subsegments 554 randomly. Additionally, the number and subsegment size for plurality of subsegments 552 may differ from the number and subsegment size for plurality of subsegments 554. Cloud storage process 520 identifies plurality of selected cloud computing environments 530 for each of plurality of subsegments 552 and 554. In other words, plurality of selected cloud computing environments 530 may be different with respect to plurality of subsegments 552 than with respect to plurality of subsegments 554. Plurality of selected cloud computing environments 530 may be identified using policy 514 and/or parameters associated with cloud storage process to include cloud computing environments with group of characteristics 536.

Cloud storage process 520 identifies a plurality of selected computing environments to store each of plurality of subsegments 552 and 554. Cloud storage process 520 may group plurality of subsegments 552 into portions, such as portion 564 and portion 566. Likewise, cloud storage process 520 may divide plurality of subsegments 552 into portions, such as portion 568 and portion 572.

Portions 564 and 568 each consist of subsegments in plurality of subsegments 552 such that all the subsegments in plurality of subsegments 552 are contained in the combination of portions 564 and 568. Portion 564 may differ from portion 568 in size and number of subsections contained in portion 564. Although portion 564 and portion 568 are used in this illustrative example, the number of portions in plurality of subsegments 552 may be higher or lower in other illustrative embodiments.

Likewise, portions 568 and 572 each consist of subsegments in plurality of subsegments 554 such that all the subsegments in plurality of subsegments 554 are contained in the combination of portions 568 and 572. Portion 568 may differ from portion 572 in size and number of subsections contained in portion 568. Although portions 568 and 572 are used in this illustrative example, the number of portions in plurality of subsegments 554 may be higher or lower in other illustrative embodiments.

In this illustrative example, plurality of selected cloud computing environments 530 is identified to store portion 564 of plurality of subsegments 552 and portion 568 of plurality of subsegments 552. Likewise, plurality of selected cloud computing environments 562 is identified to store portions 568 and 572 of plurality of subsegments 554. In this illustrative example, plurality of selected cloud computing environments 530 contains cloud computing environments 538 and 540. Plurality of selected cloud computing environments 562 contain cloud computing environments 556 and 570. Cloud storage process 520 then sends portion 564 to cloud computing environment 538 and portion 566 to cloud computing environment 540. Cloud storage process 520 also sends portion 568 to cloud computing environment 556 and portion 572 to cloud computing environment 570.

Once plurality of segments 524 are stored in plurality of selected cloud computing environments 530, application 548 may send a read request for file 512 to requestor process 508. Requestor process 508 generates request 550. Request 550 is a request to retrieve, reorder, and return file 512. Request 550 may contain a file name and/or identifier for file 512. Requestor process 508 sends request 550 to cloud storage process 520.

Cloud storage process 520 receives request 550 and identifies encrypted file 522 that matches the file name and/or identifier from request 550 in directory 546. Once information about encrypted file 522 is located in directory 546, cloud storage process 520 retrieves each of plurality of segments 524 from plurality of selected cloud computing environments 530. In this illustrative example, cloud storage process 520 requests portion 542 in cloud computing environment 538 and portion 544 in cloud computing environment 540. In the event that cloud computing environment 540 is unavailable, for example, due to maintenance, cloud storage process 520 may determine that backup copies of the segments in portion 544 are stored in portion 542. In such an illustrative embodiment, cloud storage process 520 may retrieve the segments in portion 542 and the segments in portion 544 from cloud computing environment 538.

Once plurality of segments 524 are returned to cloud storage process 520, cloud storage process 520 uses directory 546 to reorder plurality of segments 524 into the order of plurality of segments 524 in encrypted file 522. Cloud storage process 520 may reorder plurality of segments 524 by inserting a segment into position as described by the addresses within encrypted file described in each entry of directory 546 to form encrypted file 522.

When plurality of segments 524 are reordered into the order in encrypted file 522, cloud storage process 520 sends encrypted file 522 to requestor process 508. Requestor process 508 decrypts encrypted file 522 to form file 512. File 512 is returned to application 548. Application 548 is unaware of the existence of cloud storage process 520 and plurality of cloud computing environments 506 in these examples.

The illustration of computer system 502 and computer system 504 in data management environment 500 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, plurality of selected cloud computing environments 530 may encrypt portion 542 and/or portion 544, regardless of prior encryption status. Such encryption provides an additional layer of security for the data. Additionally, in some illustrative embodiments, plurality of selected cloud computing environments 530 is selected using a priority list stored on computer system 504 and accessible to cloud storage process 520. The priority list describes that a particular set of cloud computing environments are to receive portions of the plurality of segments, and how many each cloud computing environment should receive. Additionally, in some illustrative embodiments, requestor process 508 may send a request to cloud storage process 520 to remove data from plurality of selected cloud computing environments 530. Cloud storage process 520 then requests that plurality of selected cloud computing environments 530 remove the data from the clouds, and cloud storage process 520 removes information about the file from directory 546.

FIGS. 6-9 illustrate an example of data being stored in a plurality of cloud computing environments in accordance with an illustrative embodiment.

Figure 6:
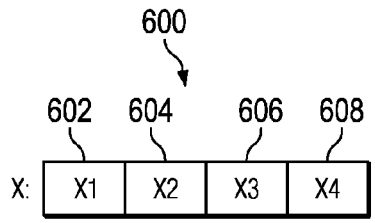
FIG. 6 depicts an illustration of a file in accordance with an illustrative embodiment.

Turning now to FIG. 6, an illustration of a file is depicted in accordance with an illustrative embodiment. File 600 is an example implementation of file 512 in FIG. 5.

File 600 is received by a cloud storage process, such as cloud storage process 520 in FIG. 5. The cloud storage process divides file 600 into segments 602, 604, 606, and 608. Segments 602, 604, 606, and 608 are examples of plurality of segments 524 in FIG. 5. Segments 602, 604, 606, and 608 are portions of file 600.

Figure 7:
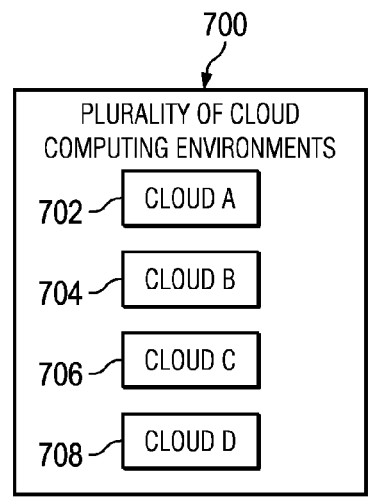
FIG. 7 depicts an illustration of a plurality of cloud computing environments in accordance with an illustrative embodiment.

Looking now to FIG. 7, an illustration of a plurality of cloud computing environments is depicted in accordance with an illustrative embodiment. Plurality of cloud computing environments 700 is an example implementation of plurality of cloud computing environments 506 in FIG. 5.

Plurality of cloud computing environments 700 consists of cloud A 702, cloud B 704, cloud C 706, and cloud D 708. Information about cloud A 702, cloud B 704, cloud C 706, and cloud D 708 is stored in a registry accessible to the cloud storage process. In these examples, the information includes address and port information for the cloud computing environments, as well as capabilities and limitations of the cloud computing environment. Characteristics of the cloud computing environment include, without limitation, a type and bitrate of encryption used on data stored in the cloud computing environment, and a maximum amount of data that may be stored in the cloud computing environment.

The cloud storage process selects cloud computing environments from plurality of cloud computing environments 700 that meet or exceed the desired characteristics in the request to store the data. The number of cloud computing environments selected may be part of a policy stored in the requestor process or the cloud storage process. The policy may indicate that a particular number of backup copies of all or a portion of the segments are to be stored in plurality of cloud computing environments 700. Backup copies are copies of a particular segment of file 600 that are stored in more than one cloud computing environment.

Figure 8:
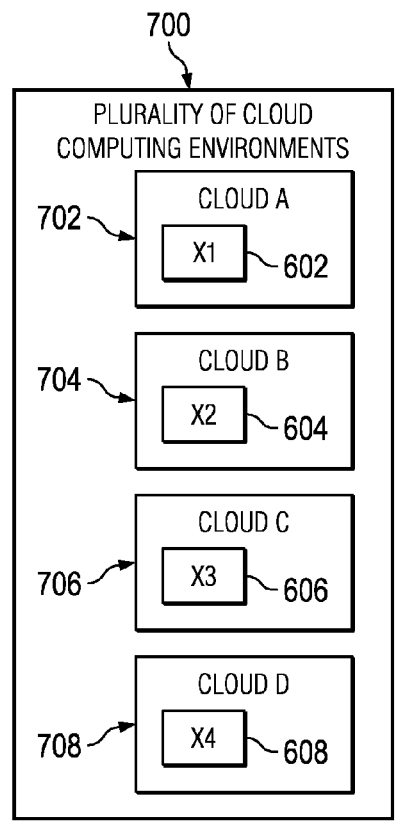
FIG. 8 depicts an additional illustration of the plurality of cloud computing environments in accordance with an illustrative embodiment.

Turning now to FIG. 8, an additional illustration of the plurality of cloud computing environments is depicted in accordance with an illustrative embodiment. In this illustrative example, the cloud storage process has sent segment x1 602 to cloud A 702 for storage, segment x2 604 to cloud B 704 for storage, segment x3 606 to cloud C 706 for storage, and segment x4 608 to cloud D 708 for storage. Segments x1 602, x2 604, x3 606, and x4 608 remain stored until a command to remove the data is received from the cloud storage process.

Figure 9:
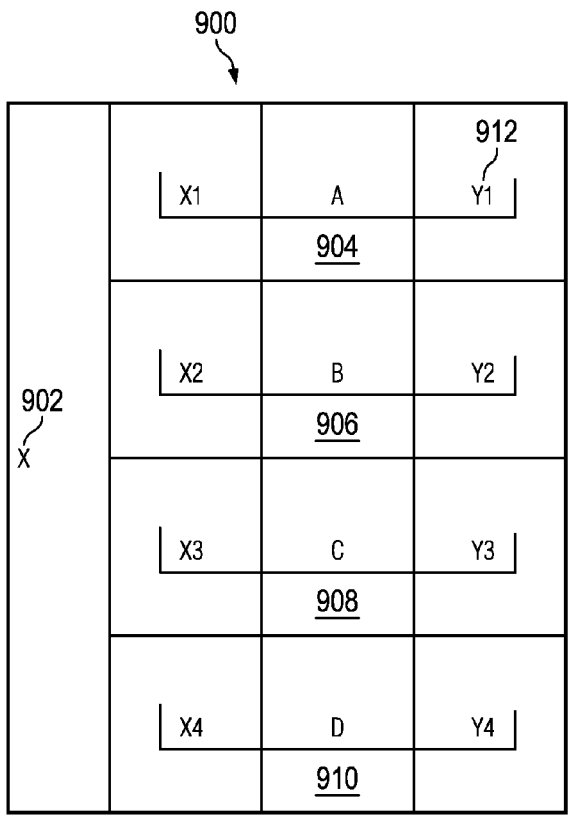
FIG. 9 depicts an illustration of a directory in accordance with an illustrative embodiment.

Looking now to FIG. 9, an illustration of a directory is depicted in accordance with an illustrative embodiment. Directory 900 is an example implementation of directory 546 in FIG. 5.

Directory 900 contains information about the storage of file 600. Directory 900 contains entry X 902 that indicates an identifier for file 600 in FIG. 6. The identifier may be either a file name, a file identifier unique in directory 900, or both a file name and a file identifier unique in directory 900. Entry X 902 contains rows 904, 906, 908, and 910. Row 904 indicates that segment X1 602 is stored in cloud A 702 in FIG. 8.

Row 904 also contains checksum Y1 912. Checksum Y1 912 is a numeric value that may be used by the cloud storage process to regenerate segment X1 602 in the event that cloud A 702 is unavailable at the time segment X1 602 is to be retrieved Likewise, row 906 indicates that segment X2 604 is stored in cloud B 704 with a checksum value of Y2. Row 908 indicates that segment X3 606 is stored in cloud C 706 with a checksum value of Y3. Row 910 indicates that segment X4 608 is stored in cloud D 708 with a checksum value of Y4. In other illustrative embodiments, some or all of plurality of cloud computing environments 700 may contain multiple segments of file 600 in FIG. 6.

FIGS. 10-14 illustrate an example of segments being divided into subsegments and stored in cloud computing environments in accordance with an illustrative embodiment.

Figure 10:
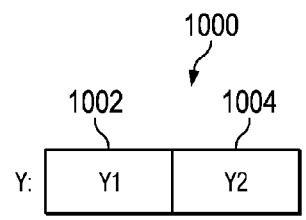
FIG. 10 depicts an illustration of an encrypted file in accordance with an illustrative embodiment.

Turning now to FIG. 10, an illustration of an encrypted file is depicted in accordance with an illustrative embodiment. Encrypted file 1000 is an example implementation of encrypted file 522 in FIG. 5.

Encrypted file 1000 is divided into segment Y1 1002 and segment Y2 1004. Segment Y1 1002 and segment Y2 1004 may be the same size or a different size. In this illustrative example, segment Y1 1002 will be divided into subsegments, and the subsegments will be stored in cloud computing environments in accordance with an illustrative embodiment.

Figure 11:
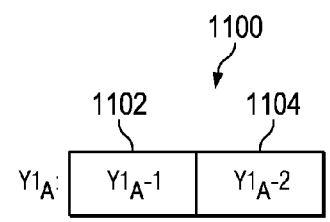
FIG. 11 depicts an illustration of a plurality of subsegments in accordance with an illustrative embodiment.

Looking now to FIG. 11, an illustration of a plurality of subsegments is depicted in accordance with an illustrative embodiment. Plurality of subsegments 1100 is an example implementation of plurality of subsegments 552 in FIG. 5.

In this illustrative example, segment Y1 1002 is divided into plurality of subsegments 1100. Plurality of subsegments 1100 consist of subsegment $Y1_A$-1 1102 and subsegment $Y1_A$-2 1104. Segment Y1 1002 may be regenerated by ordering subsegment $Y1_A$-1 1102 and subsegment $Y1_A$-2 1104 in the order in which the data in the subsegments was stored in segment Y1 1002.

Figure 12:
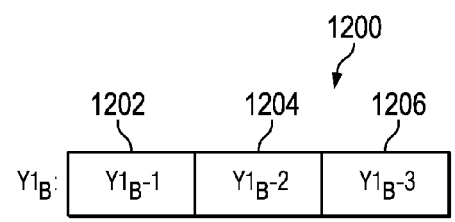
FIG. 12 depicts an illustration of an additional plurality of subsegments in accordance with an illustrative embodiment.

Turning specifically to FIG. 12, an illustration of an additional plurality of subsegments is depicted in accordance with an illustrative embodiment. Plurality of subsegments 1202 is an example implementation of plurality of subsegments 554 in FIG. 5.

A cloud storage process, such as cloud storage process 502, also divides segment Y1 1002 into plurality of subsegments 1200. Plurality of subsegments 1200 may be used to regenerate segment Y1 1002 by ordering plurality of subsegments 1200 in the order in which the data appeared in segment Y1 1102.

Segment Y1 1002 is divided into both plurality of subsegments 1100 and plurality of subsegments 1200 so an unauthorized party accessing a cloud computing environment containing one or more subsections may not regenerate segment Y1 1002 or encrypted file 1000. The unauthorized party may not know the size of the subsegments or the proper order for the subsegments to regenerate segment Y1 1002.

Figure 13:
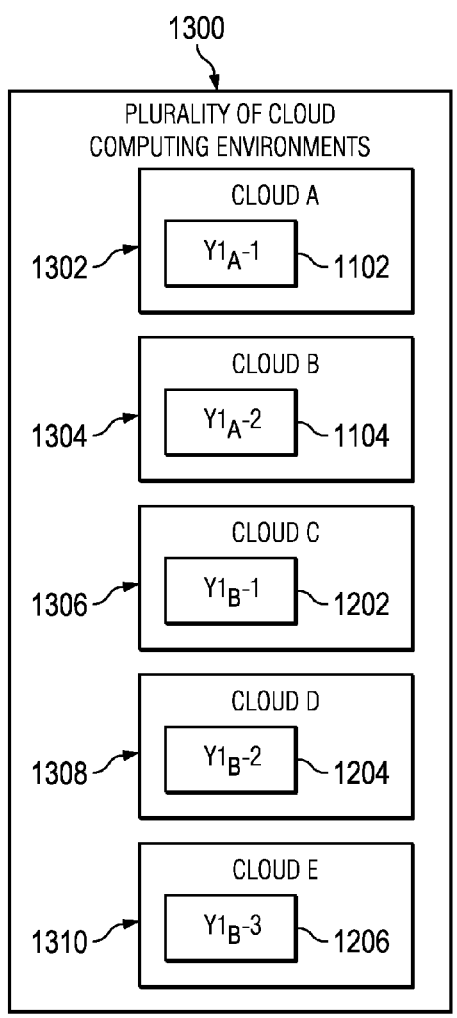
FIG. 13 depicts an additional illustration of a plurality of cloud computing environments in accordance with an illustrative embodiment.

Turning now to FIG. 13, an additional illustration of a plurality of cloud computing environments is depicted in accordance with an illustrative embodiment. Plurality of cloud computing environments 1300 is an example implementation of plurality of cloud computing environments 506 in FIG. 5.

In this illustrative example, cloud A 1302 and cloud B 1304 are identified from a registry to store plurality of subsegments 1100. Likewise, cloud C 1306, cloud D 1308, and cloud E 1310 are identified to store plurality of subsegments 1200. Thus, the cloud storage process sends subsegment $Y1_A\text{-}1$ 1102 to cloud A 1302 for storage, subsegment $Y1_A\text{-}2$ 1104 to cloud B 1304 for storage, subsegment $Y1_B\text{-}1$ 1202 to cloud C 1306 for storage, subsegment $Y1_B\text{-}2$ 1204 to cloud D 1308 for storage, and subsegment $Y1_B\text{-}3$ 1206 to cloud E 1310 for storage.

Thus, an unauthorized party with access to cloud C 1306 may attempt to access subsegment $Y1_B\text{-}1$, but the unauthorized party does not have access to the other subsegments of segment Y1 1002. Additionally, the unauthorized party is unaware of the position or order in segment Y1 1002 in which subsegment $Y1_B\text{-}1$ 1202 is to be ordered to regenerate segment Y1 1002 or encrypted file 1000. When the cloud storage process receives a request to retrieve encrypted file 1000, the cloud storage process only retrieves plurality of subsegments 1100 or plurality of subsegments 1200. Of course, the cloud storage process may also retrieve plurality of subsegments 1100 and 1200 in some illustrative examples.

Figure 14:
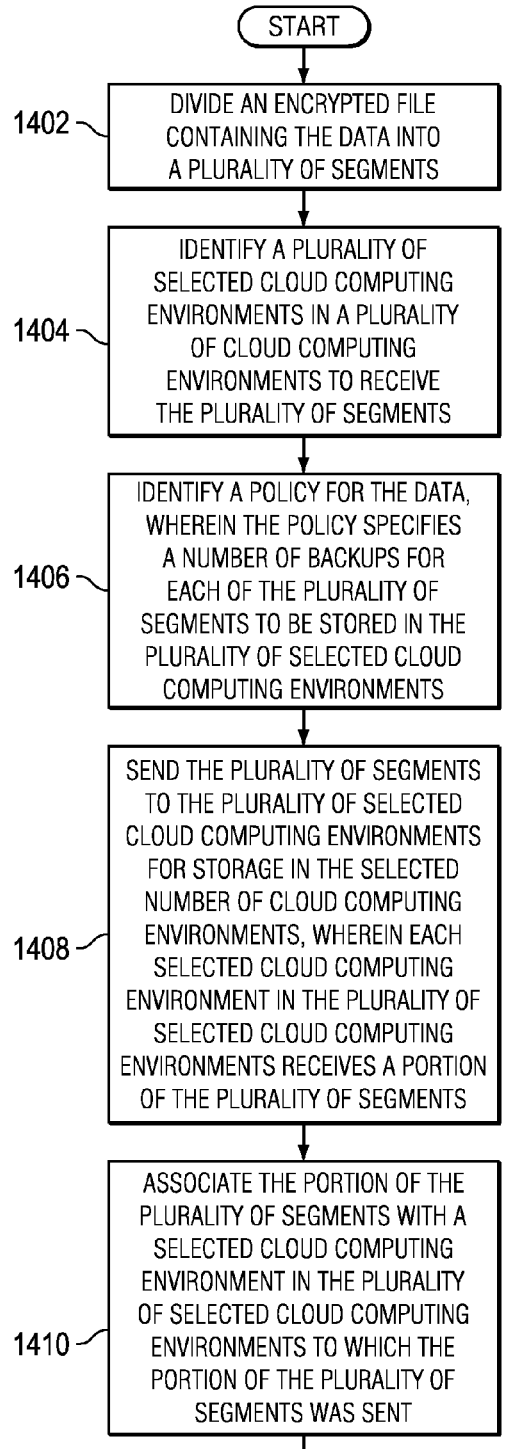
FIG. 14 depicts an illustration of a flowchart of a process for managing data in accordance with an illustrative embodiment.

Turning now to FIG. 14, an illustration of a flowchart of a process for managing data is depicted in accordance with an illustrative embodiment. The process may be performed by cloud storage process 520 running on computer system 504 in data management environment 500 in FIG. 5.

The process begins by dividing an encrypted file containing the data into a plurality of segments (step 1402). The number of segments into which the encrypted file is divided may be specified by a policy in the cloud storage process or received from a requestor process, such as requestor process 508. For example, the policy may indicate that the encrypted file is to be divided into about 10 segments, regardless of size. Alternatively, the policy may indicate that the encrypted file is to be divided into segments of about 100 megabytes, regardless of number.

The process then sends the plurality of segments to a plurality of cloud computing environments for storage in the plurality of cloud computing environments (step 1404). Each cloud computing environment in the plurality of cloud computing environments receives a portion of the plurality of segments.

The process then associates the portion of the plurality of segments with a cloud computing environment in the plurality of cloud computing environments to which the portion of the plurality of segments was sent (step 1406). The process may associate the portion of the plurality of segments with the cloud computing environment in a directory accessible to the process, such as directory 546 in FIG. 5. The process terminates thereafter.

In some illustrative embodiments, each of the plurality of segments is divided into a plurality of subsegments after step 1402. Each subsegment is a part of the segment from which it was divided. In such illustrative embodiments, the process sends the plurality of subsegments to the plurality of cloud computing environments for storage in the plurality of cloud computing environments instead of the plurality of segments at step 1404. The process then associates the portion of the plurality of subsegments with the cloud computing environment in the plurality of cloud computing environments to which the portion of the plurality of subsegments was sent instead of the portion of the plurality of segments at step 1406. The process terminates thereafter.

Figure 15:
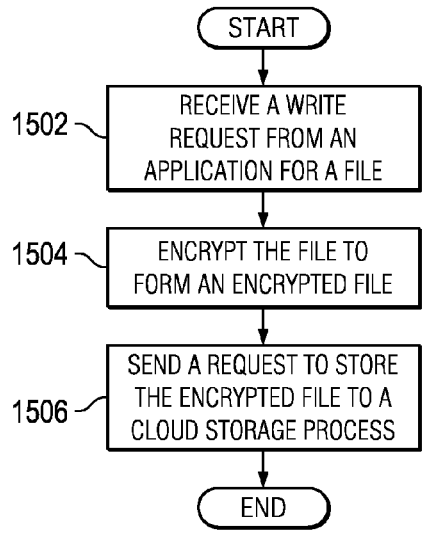
FIG. 15 depicts an illustration of a flowchart of a process for sending a request to store data in cloud computing environments in accordance with an illustrative embodiment.

Looking now to FIG. 15, an illustration of a flowchart of a process for sending a request to store data in cloud computing environments is depicted in accordance with an illustrative embodiment. The process may be performed by a requestor process, such as requestor process 508 in FIG. 5.

The process begins by receiving a write request from an application for a file (step 1502). The write request may be received using an application programming interface (API). The file may be unencrypted. The process then encrypts the file to form an encrypted file (step 1504). The process then sends a request to store the encrypted file to a cloud storage process (step 1506). The request contains the encrypted file. In some illustrative embodiments, the process also sends a policy with the request that indicates the characteristics of the cloud computing environments to store segments of the encrypted file. The policy may also indicate a number of backup copies of particular segments or each segment to be stored in cloud computing environments. The process terminates thereafter.

Figure 16:
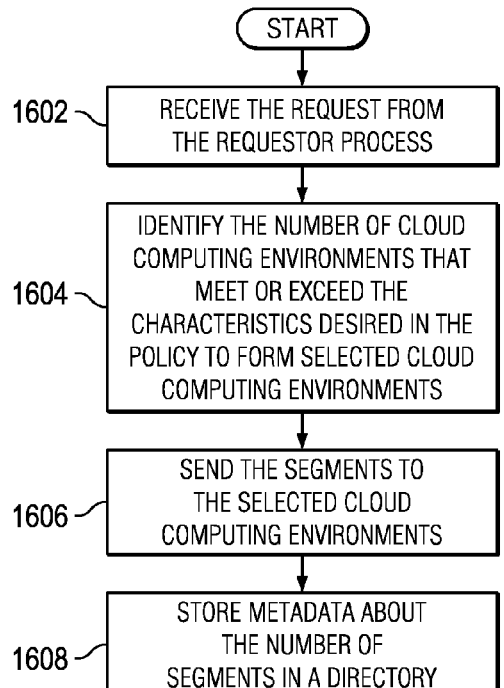
FIG. 16 depicts an illustration of a flowchart of a process for storing data in cloud computing environments in accordance with an illustrative embodiment.

Turning now to FIG. 16, an illustration of a flowchart of a process for storing data in cloud computing environments is depicted in accordance with an illustrative embodiment. The process may be performed by a cloud storage process, such as cloud storage process 520 in FIG. 5. The process may be performed after step 1504 in FIG. 15.

The process begins by receiving the request from the requestor process (step 1602). The process then identifies a number of segments into which the encrypted file is to be divided (step 1604). The number of segments may be contained in a policy received with the request or a policy accessible to the process. Of course, a default value may be used in the absence of a policy. In some illustrative embodiments, the process also identifies a number of subsegments into which each segment in the number of segments is to be divided at step 1604.

The process then identifies the number of cloud computing environments that meet or exceed the characteristics desired in the policy to form selected cloud computing environments (step 1606). The characteristics may be compared with information about the number of cloud computing environments in a registry, such as registry 528.

The process then sends the segments to the selected cloud computing environments (step 1608). The number of segments sent to each selected cloud computing environment may be contained in the policy. Of course, the process may also send the same number of segments to each selected cloud computing environment. In embodiments in which the process identifies the number of subsegments at step 1604, the process sends the subsegments to the selected cloud computing environments instead of the segments at step 1608.

The process then stores metadata about the number of segments in a directory (step 1610). The metadata consists of the file name or an identifier unique in the directory and an entry for each segment of the file. Each entry contains the identity of the cloud computing environments that store the segment, the block of addresses that make up the segment, and a checksum for the segment such that the segment may be regenerated in the presence of the other segments of the file if the segment is unavailable.

In embodiments in which the process sends the subsegments instead of the segments at step 1608, the process stores metadata about the number of subsegments in the directory. The metadata consists of the file name or an identifier unique in the directory and an entry for each subsegment of the file. Each entry contains the identity of the cloud computing environments that store the subsegment, the block of addresses in the segment that make up the subsegment, and a checksum for the subsegment such that the subsegment may be regenerated in the presence of the other subsegments of the segment if the subsegment is unavailable. The process terminates thereafter.

Figure 17:
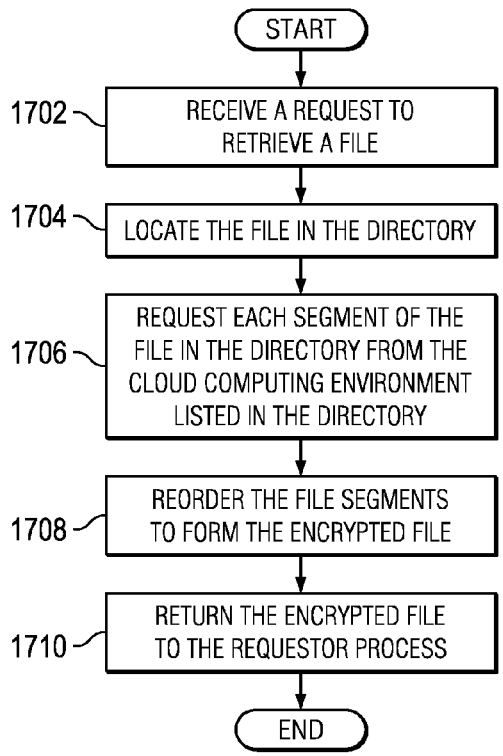
FIG. 17 depicts a flowchart of a process for retrieving data from cloud computing environments in accordance with an illustrative embodiment.

Looking now to FIG. 17, a flowchart of a process for retrieving data from cloud computing environments is depicted in accordance with an illustrative embodiment. The process may be performed by a cloud storage process, such as cloud storage process 520 in FIG. 5.

The process begins by receiving a request to retrieve a file (step 1702). The process then locates the file in the directory (step 1704). The process requests each segment of the file in the directory from the cloud computing environment listed in the directory (step 1706). In some illustrative embodiments, multiple cloud computing environments store a particular segment of the file. In such illustrative embodiments, the process may request the segment from one cloud computing environment. If the cloud computing environment is unavailable, the process may request the segment from another cloud computing environment that is listed as storing the segment in the directory.

The process then reorders the segments to form the encrypted file (step 1708). The process reorders the segments in the order described in the directory. For example, one segment may be listed in the directory as being addresses 1-100, and a second segment may be listed in the directory as being addresses 101-200. The process returns the encrypted file to the requestor process (step 1710) and terminates thereafter.

The flowchart and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, the process may not use a policy in the request to select cloud computing environments in step 1606 in FIG. 16. Instead, the process may use default values or select cloud computing environments based on a priority list of cloud computing environments. Additionally, the process may not encrypt the file at step 1504 in FIG. 15. In such an illustrative embodiment, data may not be encrypted when the cloud computing environments are trusted by the entity that controls the requestor process. Of course, the requestor process may also send the data unencrypted to the cloud storage process with a request that the cloud storage process encrypt the data.

Additionally, the process may request each subsegment of the file in the directory at step 1704 in embodiments in which the segments have been divided into subsegments. The process then reorders the subsegments to form the segments prior to performing step 1708. The process reorders the subsegments such that the subsegments are in the same order as the subsegments were prior to being sent to the cloud computing environments at step 1608.

Thus, the different illustrative embodiments allow a client computer to store data in cloud computing environments without the potential for employees or unauthorized parties at the cloud computing environments having access to the data. A user also does not select the cloud computing environments, encrypting data, and storing the data in the cloud computing environments. Additionally, the different illustrative embodiments allow for retrieval of segments of a file when a particular cloud computing environment is unavailable using either backup copies stored with other cloud computing environments or a checksum value.

Additionally, the different illustrative embodiments allow a client computer to retrieve data stored in cloud computing environments in the event that a cloud computing environment becomes unavailable due to maintenance, connectivity issues, the entity controlling the cloud computing environment disabling the cloud computing environment, or another suitable reason. The segments stored in the unavailable cloud computing environment may be stored in other cloud computing environments as backups, or the segments may be regenerated using checksum values.

Thus, the different illustrative embodiments provide a method, computer program product, and apparatus for managing data. An encrypted file containing the data is divided into a plurality of segments. The plurality of segments are sent to a plurality of cloud computing environments for storage in the plurality of cloud computing environments. Each cloud computing environment in the plurality of cloud computing environments receives a portion of the plurality of segments. The portion of the plurality of segments are associated with a cloud computing environment in the plurality of cloud computing environments to which the portion of the plurality of segments was sent.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing data, the method comprising:
receiving a request from a requestor to store an encrypted file;
dividing the encrypted file containing the data into a plurality of segments;
identifying a policy for the data, wherein the request includes the policy;
using a registry to identify a set of cloud computing environments from a plurality of cloud computing environments that meet or exceed storage characteristics identified in the policy to form a plurality of selected cloud computing environments, wherein the registry comprises an identity for each of the plurality of cloud computing environments and capability characteristics for each of the plurality of cloud computing environments;
sending the plurality of segments to the plurality of selected cloud computing environments for storage in the plurality of selected cloud computing environments, wherein each cloud computing environment in the plurality of selected cloud computing environments receives a portion of the plurality of segments; and
associating the portion of the plurality of segments with a cloud computing environment in the plurality of selected cloud computing environments to which the portion of the plurality of segments was sent.

2. The method of claim 1, wherein the step of sending the plurality of segments to the plurality of selected cloud computing environments for storage in the plurality of selected cloud computing environments comprises:
using the policy to identify a level of security desired for the encrypted file;
using the registry to select certain ones of the plurality of cloud computing environments to receive the plurality of segments based on at least meeting the level of security desired for the encrypted file to form the plurality of selected cloud computing environments; and
sending the plurality of segments to the plurality of selected cloud computing environments for storage.

3. The method of claim 1, wherein the portion is a first portion, wherein the cloud computing environment is a first cloud computing environment, and wherein the first portion of the plurality of segments is sent to the first cloud computing environment and a second portion of the of the plurality of segments is sent to a second cloud computing environment in the plurality of cloud computing environments.

4. The method of claim 1, wherein the policy specifies a set of backups for each portion to be stored in the plurality of cloud computing environments, and wherein the step of sending the plurality of segments to the plurality of selected cloud computing environments for storage in the plurality of selected cloud computing environments comprises:
using the registry when identifying the plurality of selected cloud computing environments to receive the number of backups; and
sending each of the portions to the plurality of selected of cloud computing environments.

5. The method of claim 1 further comprising:
receiving a request for the data from the requestor;
identifying the plurality of segments and the plurality of selected cloud computing environments associated with the data;
requesting the plurality of segments from the plurality of selected cloud computing environments;
ordering the plurality of segments to form the data; and
transmitting the data to the requestor.

6. The method of claim 1, further comprising:
receiving updated capability characteristics from at least one of the plurality of cloud computer environments; and
updating the registry with the updated capability characteristics.

7. The method of claim 1, wherein the registry comprises an address for each of the plurality of cloud computing environments.

8. The method of claim 1, wherein the dividing, identifying, using, sending and associating steps are performed by a unified cloud storage process that receives the data from an application program requesting to store the data.

9. The method of claim 8 further comprising:
dividing each of the plurality of segments into a first plurality of subsegments prior to sending the plurality of segments to the plurality of selected cloud computing environments for storage in the plurality of selected cloud computing environments;
dividing the each of the plurality of segments into a second plurality of subsegments prior to sending the plurality of segments to the plurality of selected cloud computing environments for storage in the plurality of selected cloud computing environments, wherein the second plurality of subsegments is different in number to the first plurality of subsegments.

10. The method of claim 9, wherein the plurality of selected cloud computing environments is a first plurality of cloud computing environments, and wherein the step of sending the plurality of segments to the plurality of selected cloud computing environments for storage in the plurality of selected cloud computing environments comprises:
sending the first plurality of subsegments to the first plurality of cloud computing environments;
sending the second plurality of subsegments to a second plurality of cloud computing environments; and
maintaining a directory that indicates where the first and second plurality of subsegments are stored in the plurality of cloud computing environments.

11. A computer program product comprising:
a non-transitory computer readable storage medium;
program code, stored on the computer readable storage medium, for receiving a request from a requestor to store an encrypted file;
program code, stored on the computer readable storage medium, for dividing the encrypted file containing data into a plurality of segments;
program code, stored on the computer readable storage medium, for identifying a policy for the data, wherein the request includes the policy;
program code, stored on the computer readable storage medium, for using a registry to identify a set of cloud computing environments from a plurality of cloud computing environments that meet or exceed storage characteristics identified in the policy to form a plurality of selected cloud computing environments, wherein the registry comprises an identity for each of the plurality of cloud computing environments and capability characteristics for each of the plurality of cloud computing environments;
program code, stored on the computer readable storage medium, for sending the plurality of segments to the plurality of selected cloud computing environments for storage in the plurality of selected cloud computing environments, wherein each cloud computing environment in the plurality of selected cloud computing environments receives a portion of the plurality of segments; and
program code, stored on the computer readable storage medium, for associating the portion of the plurality of segments with a cloud computing environment in the plurality of selected cloud computing environments to which the portion of the plurality of segments was sent.

12. The computer program product of claim 11, wherein the program code, stored on the computer readable storage medium, for sending the plurality of segments to the plurality of selected cloud computing environments for storage in the plurality of selected cloud computing environments comprises:
program code, stored on the computer readable storage medium, for using the policy to identify a level of security desired for the encrypted file;
program code, stored on the computer readable storage medium, for using the registry to select certain ones of the plurality of selected cloud computing environments to receive the plurality of segments based on at least meeting the level of security desired for the encrypted file to form the plurality of selected cloud computing environments; and
program code, stored on the computer readable storage medium, for sending the plurality of segments to the plurality of selected cloud computing environments for storage.

13. The computer program product of claim 11, wherein the portion is a first portion, wherein the cloud computing environment is a first cloud computing environment, and wherein the first portion of the plurality of segments is sent to the first cloud computing environment and a second portion of the of the plurality of segments is sent to a second cloud computing environment in the plurality of cloud computing environments.

14. The computer program product of claim 11, wherein the policy specifies a set of backups for each portion to be stored in the plurality of cloud computing environments, and wherein the program code, stored on the computer readable storage medium, for sending the plurality of segments to the plurality of selected cloud computing environments for storage in the plurality of selected cloud computing environments comprises:
program code, stored on the computer readable storage medium, for using the registry when identifying the plurality of selected cloud computing environments to receive the number of backups; and
program code, stored on the computer readable storage medium, for sending each of the portions to the plurality of selected of cloud computing environments.

15. The computer program product of claim 11 further comprising:
program code, stored on the computer readable storage medium, for dividing each of the plurality of segments into a first plurality of subsegments prior to running the program code for sending the plurality of segments to the plurality of selected cloud computing environments for storage in the plurality of selected cloud computing environments; and
program code, stored on the computer readable storage medium, for dividing the each of the plurality of segments into a second plurality of subsegments prior to running the program code for sending the plurality of segments to the plurality of selected cloud computing environments for storage in the plurality of selected cloud computing environments, wherein the second plurality of subsegments is different in number to the first plurality of subsegments.

16. The computer program product of claim 15, wherein the plurality of selected cloud computing environments is a first plurality of cloud computing environments, and wherein the program code, stored on the computer readable storage medium, for sending the plurality of segments to the plurality of selected cloud computing environments for storage in the plurality of selected cloud computing environments comprises:

program code, stored on the computer readable storage medium, for sending the first plurality of subsegments to the first plurality of cloud computing environments;

program code, stored on the computer readable storage medium, for sending the second plurality of subsegments to a second plurality of cloud computing environments; and program code, stored on the computer readable storage medium, for maintaining a directory that indicates where the first and second plurality of subsegments are stored in the plurality of cloud computing environments.

17. An apparatus comprising:

a bus system;

a storage device connected to the bus system, wherein the storage device includes program code; and a processor unit connected to the bus system, wherein the processor unit executes the program code to receive a request from a requestor to store an encrypted file, to divide the encrypted file containing data into a plurality of segments, identify a policy for the data, wherein the request includes the policy, use a registry to identify a set of cloud computing environments from a plurality of cloud computing environments that meet or exceed storage characteristics identified in the policy to form a plurality of selected cloud computing environments, wherein the registry comprises an identity for each of the plurality of cloud computing environments and capability characteristics for each of the plurality of cloud computing environments, send the plurality of segments to the plurality of selected cloud computing environments for storage in the plurality of selected cloud computing environments, wherein each cloud computing environment in the plurality of selected cloud computing environments receives a portion of the plurality of segments, and associate the portion of the plurality of segments with a cloud computing environment in the plurality of selected cloud computing environments to which the portion of the plurality of segments was sent.

* * * * *